US012262165B1

(12) United States Patent
Huang et al.

(10) Patent No.: US 12,262,165 B1
(45) Date of Patent: Mar. 25, 2025

(54) METHOD AND APPARATUS FOR DETECTING WEARING STATE OF EARPHONE, EARPHONE, AND STORAGE MEDIUM

(71) Applicant: SHENZHEN TONLY SCIENCE AND TECHNOLOGY DEVELOPMENT CO., LTD, Shenzhen (CN)

(72) Inventors: Liechao Huang, Shenzhen (CN); Yucheng Zhao, Shenzhen (CN); Guanghui Han, Shenzhen (CN); Jinhui Li, Shenzhen (CN); Hua Yan, Shenzhen (CN); Xinwen Chen, Shenzhen (CN)

(73) Assignee: SHENZHEN TONLY SCIENCE AND TECHNOLOGY DEVELOPMENT CO., LTD, Shenzhen (CN)

( * ) Notice: Subject to any disclaimer, the term of this patent is extended or adjusted under 35 U.S.C. 154(b) by 0 days.

(21) Appl. No.: 18/903,789

(22) Filed: Oct. 1, 2024

Related U.S. Application Data

(63) Continuation of application No. PCT/CN2023/139568, filed on Dec. 18, 2023.

(30) Foreign Application Priority Data

Nov. 9, 2023 (CN) ......................... 202311491064.1

(51) Int. Cl.
*H04R 1/10* (2006.01)
*H04R 1/08* (2006.01)

(52) U.S. Cl.
CPC ............ *H04R 1/1041* (2013.01); *H04R 1/08* (2013.01); *H04R 2430/03* (2013.01)

(58) Field of Classification Search
CPC ................................ H04R 1/1041; H04R 1/08
See application file for complete search history.

(56) References Cited

U.S. PATENT DOCUMENTS

2017/0339483 A1* 11/2017 Ergezer ................ H04R 1/1041
2018/0227659 A1* 8/2018 Kumar ............. G10K 11/17835

(Continued)

FOREIGN PATENT DOCUMENTS

CN 103581796 A 2/2014
CN 106982403 A 7/2017

(Continued)

OTHER PUBLICATIONS

International Search Report issued in corresponding PCT Application No. PCT/CN2023/139568, dated Jul. 19, 2024.

(Continued)

*Primary Examiner* — Simon King
(74) *Attorney, Agent, or Firm* — Westbridge IP LLC

(57) ABSTRACT

Disclosed are a method and an apparatus for detecting a wearing state of an earphone, an earphone, and a storage medium. The method includes: obtaining a request for detecting the wearing state of the earphone; performing audio collection by a feedback microphone of the earphone to obtain a feedback audio signal; determining a frequency of the audio, and determining a target frequency with a power meeting a preset condition in the feedback audio signal based on the frequency and an audio collection parameter of the feedback microphone; performing a power spectrum analysis on the feedback audio signal to obtain a power spectrum of the feedback audio signal; determining target power information of the target frequency from the power spectrum; and in response to the target power infor- (Continued)

mation being not less than a maximum power threshold value set for the target frequency, determining that the wearing state is in-ear state.

15 Claims, 3 Drawing Sheets

(56) References Cited

U.S. PATENT DOCUMENTS

| | | | | |
|---|---|---|---|---|
| 2020/0014996 | A1 | 1/2020 | Kumari et al. | |
| 2024/0073219 | A1* | 2/2024 | Maizels | G10L 15/16 |

FOREIGN PATENT DOCUMENTS

| | | | |
|---|---|---|---|
| CN | 109196879 | A | 1/2019 |
| CN | 110278509 | A | 9/2019 |
| CN | 112995881 | A | 6/2021 |
| CN | 113473286 | A | 10/2021 |
| CN | 114697849 | A | 7/2022 |
| CN | 115361647 | A | 11/2022 |

OTHER PUBLICATIONS

Notification to Grant Patent Right for Invention issued in counterpart Chinese Patent Application No. 202311491064.1, dated Jun. 27, 2024.

Written Opinion issued in corresponding PCT Application No. PCT/CN2023/139568, dated Jul. 19, 2024.

* cited by examiner

METHOD AND APPARATUS FOR DETECTING WEARING STATE OF EARPHONE, EARPHONE, AND STORAGE MEDIUM

CROSS-REFERENCE TO RELATED APPLICATIONS

This application is a continuation application of International Application No. PCT/CN2023/139568, filed on Dec. 18, 2023, which claims priority to Chinese Patent Application No. 202311491064.1, filed on Nov. 9, 2023. The disclosures of the above-mentioned applications are incorporated herein by reference in their entireties.

TECHNICAL FIELD

The present application relates to the technical field of terminal control, and in particular to a method and an apparatus for detecting a wearing state of an earphone, an earphone, and a storage medium.

BACKGROUND

In recent years, the market of true wireless stereo (TWS) earphones has been heating up. Since TWS earphones are small and portable and very convenient to use, TWS earphones are popular among consumers. At present, mid-to-high-end TWS earphones support in-ear detection function, which can easily play music automatically after wearing, automatically pause music when taking off, making the earphones more intelligent and energy-saving.

At present, the mainstream TWS earphone wearing detection solutions mainly include capacitive sensor detection solution and optical sensor detection solution. The capacitive solution determines whether the earphone is in-ear state by sensing the capacitance value of the human body. The advantage of the capacitive detection solution is low cost, and no holes are required in the housing, which looks more beautiful. The disadvantage is that the misoperation rate is high. The optical detection solution uses the emission of infrared light. The reflected and received level signals determine whether the earphone is in-ear state. Compared with the capacitive detection solution, the advantage of the optical detection solution is higher accuracy, but its cost is higher, there are also misoperations in some scenarios, and it has high requirements for production and assembly processes.

However, the above two solutions can easily misdetermine the earphones as being in-ear. For example, in common scenarios such as taking the earphones off and placing them on the table, holding them in your hand, or putting them in your pocket, the light sensor or the capacitive sensor can easily misdetermine the earphones as being in-ear, which can lead to inaccurate wearing detection, affect the user experience, and increase the power consumption of the earphones.

SUMMARY

The embodiments of the present application provide a method and an apparatus for detecting a wearing state of an earphone, an earphone and a storage medium, which can improve the accuracy of detecting the wearing state of an earphone.

According to a first aspect, the present application provides a method for detecting a wearing state of an earphone, including:

- obtaining a request for detecting the wearing state of the earphone;
- performing audio collection by a feedback microphone of the earphone to obtain a feedback audio signal;
- determining a frequency of the audio, and determining a target frequency with a power meeting a preset condition in the feedback audio signal based on the frequency and an audio collection parameter of the feedback microphone;
- performing a power spectrum analysis on the feedback audio signal to obtain a power spectrum of the feedback audio signal;
- determining target power information of the target frequency from the power spectrum; and
- in response to the target power information being not less than a maximum power threshold value set for the target frequency, determining that the wearing state of the earphone is in-ear state.

According to a second aspect, the present application further provides an apparatus for detecting a wearing state of an earphone, including: a detection request acquisition module, a feedback audio signal acquisition module, a target frequency determination module, a power spectrum determination module, a target power information determination module, and a wearing state determination module.

The detection request acquisition module is configured to obtain a request for detecting the wearing state of the earphone.

The feedback audio signal acquisition module is configured to perform audio collection by a feedback microphone of the earphone to obtain a feedback audio signal.

The target frequency determination module is configured to determine a target frequency with a power meeting a preset condition in the feedback audio signal based on the frequency and an audio collection parameter of the feedback microphone.

The power spectrum determination module is configured to perform a power spectrum analysis on the feedback audio signal to obtain a power spectrum of the feedback audio signal.

The target power information determination module is configured to determine target power information of the target frequency from the power spectrum.

The wearing state determination module is configured to determine that the wearing state of the earphone is in-ear state in response to the target power information being not less than a maximum power threshold value set for the target frequency.

According to a third aspect, an embodiment of the present application further provides an earphone, including a processor and a memory storing multiple instructions. The processor loads instructions from the memory to execute the method for detecting the wearing state of the earphone provided in the embodiment of the present application.

According to a fourth aspect, the present application further provides a computer-readable storage medium. The computer-readable storage medium stores multiple instructions suitable for a processor to load to execute the method for detecting the wearing state of the earphone provided by the embodiment of the present application.

According to a fifth aspect, the present application further provides a computer program product, including a computer program or instructions. When the computer program or the instructions are executed by a processor, the method for detecting the wearing state of the earphones provided in the present application are implemented.

By adopting the solution according to the embodiment of the present application, a request for detecting the wearing state of the earphone is obtained; the audio collection is performed by a feedback microphone of the earphone to obtain a feedback audio signal; the frequency of the audio is determined, and a target frequency with a power meeting a preset condition in the feedback audio signal is determined based on the frequency and an audio collection parameter of the feedback microphone; a power spectrum analysis is performed on the feedback audio signal to obtain a power spectrum of the feedback audio signal; target power information of the target frequency is determined from the power spectrum; and in response to the target power information being not less than a maximum power threshold value set for the target frequency, it is determined that the wearing state of the earphone is in-ear state. By performing power spectrum analysis on the feedback audio signal collected by the feedback microphone, a target frequency whose power meets a preset condition in the feedback audio signal can be determined, and the target power information of the target frequency can be analyzed, thereby improving the detection accuracy of the wearing state of the earphone.

BRIEF DESCRIPTION OF THE DRAWINGS

In order to more clearly illustrate the technical solutions in the embodiments of the present disclosure or in the related art, drawings used in the embodiments or in the related art will be briefly described below. Obviously, the drawings in the following description are only some embodiments of the present disclosure. It will be apparent to those skilled in the art that other figures can be obtained according to the structures shown in the drawings without creative work.

DETAILED DESCRIPTION OF THE EMBODIMENTS

Figure 1:
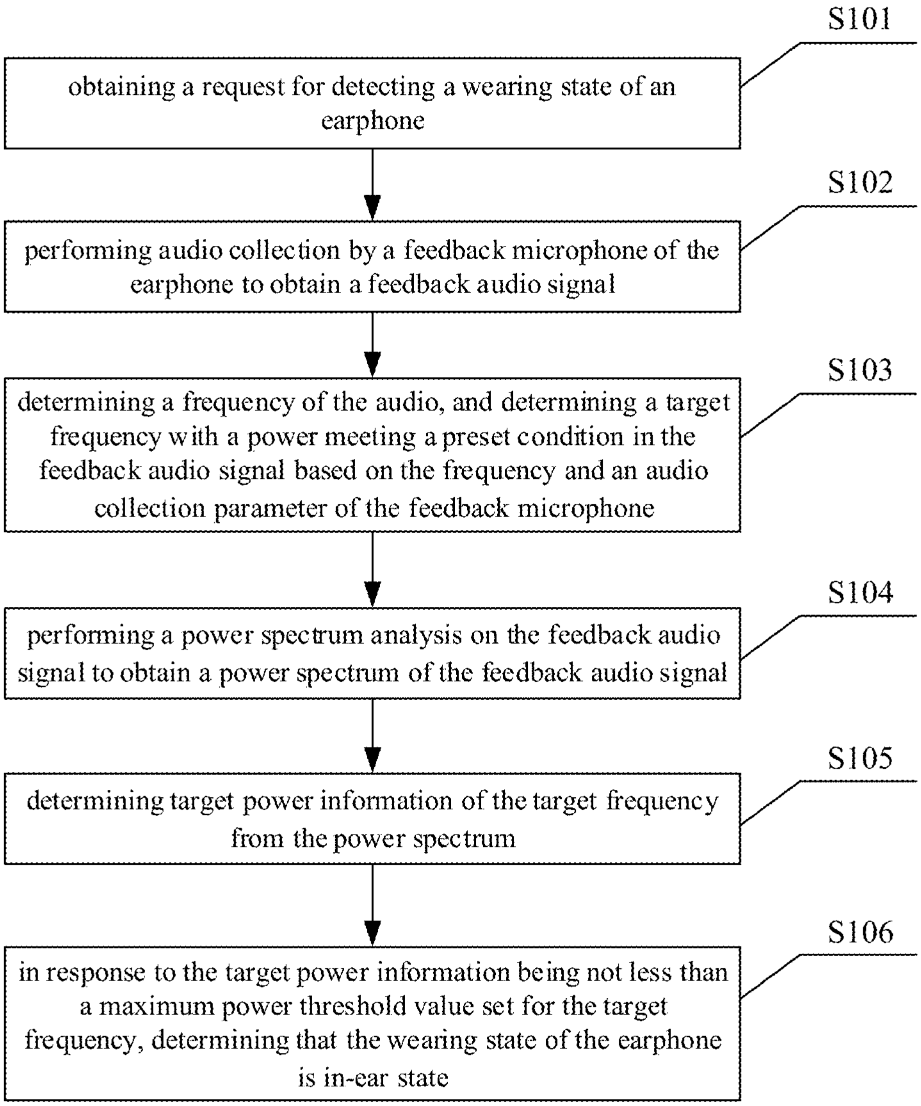
FIG. 1 is a schematic diagram of a method for detecting a wearing state of an earphone according to an embodiment of the present application.

The following will be combined with the drawings in the embodiments of the present application to clearly and completely describe the technical solutions in the embodiments of the present application. Obviously, the described embodiments are only part of the embodiments of the present application, rather than all the embodiments. Based on the embodiments in the present application, all other embodiments obtained by those skilled in the art without creative work belong to the scope of protection of the present application. At the same time, in the description of the embodiments of the present application, the terms "first", "second", etc. are only used to distinguish the descriptions, and cannot be understood as indicating or implying relative importance. Therefore, the features defined as "first" and "second" may explicitly or implicitly include one or more features. In the description of the embodiments of the present application, "multiple" means two or more, unless otherwise clearly and specifically defined.

Embodiments of the present application provide a method and an apparatus for detecting a wearing state of an earphone, an earphone, and a computer-readable storage medium.

Specifically, the embodiment will be described from the perspective of an apparatus for detecting a wearing state of an earphone. The apparatus for detecting the wearing state of the earphone can be specifically integrated in an earphone. That is, the method for detecting the wearing state of the earphone according to the embodiment of the present application can be executed by the earphone. In an embodiment, the earphone can be a terminal device with a data processing function. The terminal device is an earphone. The type of earphone is not limited, such as wired earphones, wireless earphones, Bluetooth earphones, headphones, etc. The earphone can exist alone, or exist as an accessory device on a device such as a head-mounted display device, which is not limited by the embodiment.

In an embodiment, the apparatus for detecting the wearing state of the earphone can be specifically integrated into a true wireless stereo (TWS) earphone, which refers to an earphone without a traditional connecting wire, including Bluetooth earphones, infrared earphones, etc. TWS earphones support in-ear detection function. In-ear detection is also called wearing detection function, applicable to TWS true wireless earphones, realizing the following main functions: determining whether the user wears/takes off the earphones. At present, the TWS earphone wearing detection solutions mainly include capacitive sensor detection solution and optical sensor detection solution. The embodiment of the present application is suitable for a capacitive sensor detection solution, an optical sensor detection solution, or a sensor detection solution made by a combination and improvement thereof for performing wearing state detection on the earphone.

The following is a detailed description with reference to the accompanying drawings. In an embodiment, the execution subject is an earphone that can call a deduplication algorithm. It should be noted that the description order of the following embodiments is not intended to limit the order of the embodiments. Although the logical order is shown in the flowchart, in some cases, the steps shown or described may be performed in an order different from that shown in the accompanying drawings.

As shown in FIG. 1, the specific process of the method for detecting the wearing state of the earphone can be as follows:

Step S101: obtaining a request for detecting the wearing state of the earphone.

In an embodiment, the above-mentioned earphone wearing state detection request refers to a request for detecting the wearing state of the earphone. The wearing state of the earphone includes but is not limited to the in-ear state and the out-ear state. The in-ear state refers to the state in which the earphone is worn and the earphone is located inside the user's ear. The in-ear state includes the state in which the earphone has just entered the user's ear, and also includes the continuous state in which the earphone is located inside the user's ear. The out-ear state refers to the state in which the earphone is not worn and the earphone is located outside the user's ear. For example, the earphone is in the earphone box, the earphone is on the table, the earphone is in the user's hand, the earphone is in the user's pocket, etc., which are all regarded as the wearing state of the earphone being the out-ear state.

In an embodiment, the above-mentioned earphones refer to earphones that need to perform earphone wearing state detection, such as active noise reduction earphones. Or, the earphones are one of the true wireless earphones. Specifically, if the earphones are one of the true wireless earphones, the wireless connection method between the earphone and another earphone or with a smart device can be at least one of wireless fidelity (Wi-Fi) communication manner, classic Bluetooth communication manner, Bluetooth low energy (BLE) communication manner, low energy (LE) audio, advanced and adaptive network technology (ANT) communication manner, radio frequency for consumer electronics (RF4CE) communication manner, Zigbee communication manner, near field communication (NFC) communication manner, and ultra-wideband (UWB) communication manner.

In an embodiment, the request for detecting the wearing state of the earphone may be triggered according to actual conditions.

For example, the obtaining the request for detecting the wearing state of the earphone may specifically include:

generating the request for detecting the wearing state of the earphone periodically; or in response to a sensor of the earphone recognizing that the wearing state of the earphone is switched to the in-ear state, generating the request for detecting the wearing state of the earphone.

In an embodiment, the request for detecting the wearing state of the earphone is generated at the time when the timer is triggered. The duration of the request for detecting the wearing state of the earphone generated at the time when the timer is triggered can be adjusted according to the actual situation. For example, the trigger time of the timer is 1.5 seconds, that is, the request for detecting the wearing state of the earphone is generated every 1.5 seconds. By generating the request for detecting the wearing state of the earphone at a reasonable timing, the request for detecting the wearing state of the earphone can be responded to quickly, which improves the response efficiency of the wearing detection and improves the user experience at the same time.

In an embodiment, according to the type of the earphone sensor, the earphone sensor collects a signal related to the earphone sensor type. According to the collected signal, it is determined whether the wearing state of the earphone has changed. For example, when the earphone sensor type is a capacitive sensor, the capacitance value is collected by the capacitive sensor of the earphone. According to the change of the capacitance value, it is determined whether the wearing state of the earphone has changed. For another example, when the earphone sensor is an optical sensor, the level signal is collected by the optical sensor of the earphone. According to the change of the level signal, it is determined whether the wearing state of the earphone has changed. When the earphone sensor determines that the wearing state of the earphone is switched to the in-ear state according to the collected signal, the request for detecting the wearing state of the earphone is generated. It is determined that the wearing state of the earphone is switched to the in-ear state. For example, it is switched from the out-ear state to the in-ear state. For another example, it is switched from other states to the in-ear state. If the sensor of the earphone determines that the wearing state of the earphone is switched to the out-ear state according to the collected signal, or, the wearing state of the earphone is a continuous out-ear state. Or, the wearing state of the earphone is a continuous in-ear state, then the sensor of the earphone continues to collect signals. The continuous out-ear state refers to the duration of the out-ear state exceeding the preset duration. The continuous in-ear state means that the duration of the in-ear state exceeds a preset duration. The preset duration is set according to the actual situation. For example, the preset duration is 200 milliseconds.

Step S102: performing audio collection by a feedback microphone of the earphone to obtain a feedback audio signal.

In an embodiment, the feedback microphone may be provided at the front end of the speaker of the earphone, and is configured to collect audio signals in the current environment. The audio includes but is not limited to prompt tones, friction sounds between the earphone and the ear canal when the earphone is inserted into the ear, and external ambient sounds. The prompt tone may be played through the earphone, and the prompt tone has a preset frequency.

In an embodiment, when the audio includes a prompt tone, the prompt tone is collected by the feedback microphone of the earphone to obtain the feedback audio signal. When the audio includes external ambient sound, the external ambient sound is collected by the feedback microphone of the earphone to obtain the feedback audio signal. Specifically, the audio setting can be set according to actual conditions.

It is understandable that when the audio includes the friction sound between the earphone and the ear canal when the earphone is in-ear state and the external ambient sound, it is determined in combination with the specific scenario of the earphone. For example, when the actual wearing state of the earphone is in-ear state, the audio collected by the feedback microphone is mainly the friction sound between the earphone and the ear canal when the earphone is in-ear state. When the actual wearing state of the earphone is out-ear state, the audio collected by the feedback microphone is mainly the external ambient sound.

In an embodiment, when the audio is a prompt tone, the prompt tone is configured to detect the wearing state of the earphone. The frequency of the prompt tone includes but is not limited to ultrasonic waves, infrasound waves, and audible sound waves. The ultrasonic waves refer to sound waves with a frequency range exceeding 20,000 Hz. Infrasound waves refer to sound waves with a frequency range below 20 Hz. Audible sound waves refer to sound waves with a frequency range of 20 Hz to 20,000 Hz that can be heard by the human ear. When the frequency of the prompt tone is within the frequency range that can be heard by the human ear, the prompt tone can be set according to actual conditions. For example, the prompt tone is two “ding ding” sounds. For example, the prompt tone is “start the in-ear detection function”. The frequency of the prompt tone can be set according to the specific situation. For example, a prompt tone with a frequency of 20 Hz is set. For example, a prompt tone with a frequency of 10 Hz is set. In an embodiment, infrasound is set as a prompt tone.

In an embodiment, when using the speakers in the earphones to play infrasound waves, and the earphones are in or out of the ears. The amplitude of the infrasound waves collected by their feedback microphones is significantly different. When the earphones are in-ear states, the amplitude of the infrasound waves collected by its feedback microphone becomes significantly larger. Using the infrasound waves as prompt tone and performing the wearing state detection of the earphone make the detection results more accurate.

Step S103: determining a frequency of the audio, and determining a target frequency with a power meeting a preset condition in the feedback audio signal based on the frequency and an audio collection parameter of the feedback microphone.

In an embodiment, according to the frequency range of the frequency band signal to be analyzed, a suitable filter is adopted to select the frequency band signal to be analyzed from the audio. The frequency corresponding to the frequency band signal is the frequency of the audio. The frequency range of the frequency band signal to be analyzed is related to the type of filter. For example, when the frequency band signal to be analyzed is a low-frequency signal, the filter is a low-frequency filter.

In an embodiment, the audio collection parameters of the feedback microphone include but are not limited to signal length, signal sampling rate, and signal type. The signal length refers to the duration of collecting the audio signal. For example, the collected signal length is 0.5 seconds to 1.2 seconds. The sampling rate refers to the quantity of samples of the audio signal per unit time. For example, a sampling rate of 16 k means 16,000 samples in 1 second. The signal type refers to the sound wave type of the audio signal. For example, the audio signal is ultrasonic, or, the audio signal is infrasound.

In an embodiment, the audio collection parameters of the feedback microphone may also be any one of time domain distribution parameters, frequency domain distribution parameters, time domain distribution parameter variation, frequency domain distribution parameter variation, energy in the time domain and/or frequency domain, energy variation in the time domain and/or frequency domain, or a combination thereof. The parameters of the preset audio signal with the highest similarity may be selected based on the similarity of the time domain distribution parameters, the frequency domain distribution parameters, and the energy in the time domain and/or frequency domain.

In an embodiment, the target frequency refers to the frequency configured to detect the wearing state of the earphone in the feedback audio signal. When the audio is a prompt tone, the frequency is the preset frequency of the prompt tone. The target frequency is close to the frequency of the played prompt tone. The power meeting the preset condition can be that the power of the target frequency is the maximum frequency in the feedback audio signal. It can also be that the power of the target frequency is greater than the minimum power threshold value set for the wearing state of the earphone to be in-ear state. The preset condition can be adjusted according to actual conditions. By determining the target frequency whose power in the feedback audio signal meets the preset condition, the target frequency is analyzed, thereby improving the accuracy of detecting the wearing state of the earphone.

In an embodiment, the audio collection parameters include a sampling rate; the determining the target frequency with the power meeting the preset condition in the feedback audio signal based on the frequency and the audio collection parameter of the feedback microphone includes:

- calculating a power spectrum of the feedback audio signal based on the sampling rate and frequency; and
- configuring a frequency with the maximum power as the target frequency according to the power spectrum.

In an embodiment, based on the sampling rate and frequency, a Fourier transform is performed on each frame of the feedback audio signal to determine the frequency and power of each frame of the signal, and the frequency corresponding to the maximum power is configured as the target frequency.

In an embodiment, the audio collection parameters include a sampling rate; the determining the target frequency with the power meeting the preset condition in the feedback audio signal based on the frequency and the audio collection parameter of the feedback microphone includes:

- calculating the frequency with the maximum power in the audio signal collected by the feedback microphone based on the sampling rate;
- in response to a difference between the frequency with the maximum power and the frequency being greater than a frequency difference, adjusting the sampling rate until the difference is not greater than the frequency difference, configuring the frequency with the maximum power as the target frequency; or
- in response to the difference between the frequency with the maximum power and the frequency being not greater than the frequency difference, configuring the frequency with the maximum power as the target frequency.

In an embodiment, the frequency with the highest power refers to the frequency corresponding to the maximum power calculated from the audio signal collected by the feedback microphone. The frequency difference is configured to characterize the maximum frequency difference between the frequency with the highest power in the audio signal collected by the feedback microphone and the frequency of the audio. The above adjustment of the sampling rate, for example, adjusts the original sampling rate of 16 k to 32 k.

Step S104: performing a power spectrum analysis on the feedback audio signal to obtain a power spectrum of the feedback audio signal.

In an embodiment, the power spectrum is the abbreviation of the power spectrum density function. It is defined as the signal power within a unit frequency band. It represents the change of signal power with frequency, that is, the distribution of signal power in the frequency domain. The power spectrum represents the change relationship of signal power with frequency.

In an embodiment, the feedback audio signal is filtered according to the frequency of the audio, the power spectrum of the feedback audio signal after filtering is determined, and the power corresponding to the audio signal of the same frequency in the power spectrum is averaged to obtain the average power spectrum of several frame signals in the feedback audio signal.

In an embodiment, when the frequency of the audio is infrasound, the feedback audio signal is low-pass filtered. For example, when the frequency of the audio is 20 Hz, the feedback audio signal can be low-pass filtered to retain the frequency of 0-120 Hz in the feedback audio signal.

In an embodiment, the feedback audio signal collected by the feedback microphone is filtered and the power spectrum is analyzed. The average power spectrum of several frames of the feedback audio signal collected by the feedback microphone is obtained. The energy of the feedback audio signal is relatively strong when it is in-ear state. The power spectrum of the feedback audio signal is analyzed to improve the accuracy of the wearing state of the earphone detection.

Step S105: determining target power information of the target frequency from the power spectrum.

In an embodiment, the target power information refers to the power information of the target frequency. For example, when the target frequency is 32 Hz, the power corresponding to the frequency of 32 Hz in the power spectrum is the target power information.

It can be understood that when the power spectrum is an average power spectrum, there is a one-to-one relationship between the target frequency in the power spectrum, that is, the target frequency and the power information of the target frequency are in a one-to-one relationship. If the target frequency is known, the power information of the target frequency can be determined. In addition, when the power spectrum is not an average power spectrum, all powers corresponding to the target frequency can be obtained from the power spectrum. All powers are configured as target power information. The power in the target power information can be averaged, or weighted averaged. The specific setting can be made according to the actual situation.

In an embodiment, by determining the power information of the target frequency, the wearing state of the earphone can be determined by analyzing the difference in power of the target frequency in the out-ear state and in-ear state, thereby improving the accuracy of the wearing state of the earphone detection.

Step S106: in response to the target power information being not less than a maximum power threshold value set for the target frequency, determining that the wearing state of the earphone is in-ear state.

In an embodiment, the maximum power threshold value is configured to characterize the power threshold value at which the audio signal collected by the feedback microphone is determined to be in the in-ear state at the target frequency. That is, the target power information is not less than the power threshold value at which the audio signal collected by the feedback microphone is determined to be in the in-ear state at the target frequency. It can be determined that the wearing state of the earphone is in the in-ear state.

It is understandable that the maximum power threshold value can be obtained by pre-measurement through experiments. The purpose of setting the above maximum power threshold value is to identify whether the wearing state of the earphone is in-ear state by comparing the target power information with the maximum power threshold value. When the earphone is switched to the in-ear state, the target power information and the maximum power threshold value are configured to determine whether the earphone is indeed in the in-ear state, so as to improve the accuracy of the wearing state of the earphone detection.

In an embodiment, if the target power information is less than the maximum power threshold value set for the target frequency, the wearing state of the earphone can be determined according to the actual situation. For example, if the target power information is less than the maximum power threshold value set for the target frequency, the wearing state of the earphone is directly determined to be the out-ear state. For another example, if the target power information is less than the maximum power threshold value set for the target frequency, the target power information is further analyzed to determine the wearing state of the earphone. Whether the earphone is indeed in the in-ear state is determined by the target power information and the maximum power threshold value, improving the accuracy of the wearing state of the earphone detection.

In an embodiment, after the in response to the target power information being not less than the maximum power threshold value set for the target frequency, determining that the wearing state of the earphone is in-ear state, the method further includes:

in response to the target power information being less than a minimum power threshold value set for the target frequency, determining that the wearing state of the earphone is an out-ear state.

In an embodiment, the power threshold values set for the target frequency include a maximum power threshold value and a minimum power threshold value. The maximum power threshold value is configured to characterize the power threshold value of the audio signal collected by the feedback microphone at the target frequency, which is determined to be in-ear state. The minimum power threshold value is configured to characterize the power threshold value of the audio signal collected by the feedback microphone at the target frequency, which is determined to be out-ear state. That is, the target power information is not less than the maximum power threshold value, and it can be determined that the wearing state of the earphone is in-ear state. The target power information is less than the minimum power threshold value, and it can be determined that the wearing state of the earphone is in-ear state. If the target power information is within the range of the minimum power threshold value and the maximum power threshold value, the wearing state of the earphone cannot be determined.

It is understandable that the maximum power threshold value and the minimum power threshold value can be obtained by pre-measurement through experiments. The purpose of setting the above-mentioned maximum power threshold value is to identify whether the wearing state of the earphone is in-ear state by comparing the target power information with the maximum power threshold value. The purpose of setting the above-mentioned minimum power threshold value is to identify whether the wearing state of the earphone is out-ear state by comparing the target power information with the minimum power threshold value. When the earphone is switched to the in-ear state, the target power information and the maximum power threshold value are configured to determine whether the earphone is indeed in the in-ear state. Or, the target power information and the minimum power threshold value are configured to determine whether the earphone is in the out-ear state to improve the accuracy of the wearing state of the earphone detection.

In an embodiment, in response to performing the audio collection by the feedback microphone of the earphone, the method further includes:

performing the audio collection by a feedforward microphone of the earphone to obtain a feedforward audio signal;

performing a differential feature analysis on the feedforward audio signal and the feedback audio signal to obtain a differential feature value of the feedforward audio signal and the feedback audio signal; and in response to the differential feature value being not less than a preset differential feature maximum threshold value, determining that the wearing state of the earphone is in-ear state, the preset differential feature maximum threshold value is configured to characterize a maximum differential feature value of the audio signal collected by the feedback microphone and the feedforward microphone in the in-ear state.

In an embodiment, the feedforward microphone can be provided at a position of the earphone housing close to the outside of the ear, and is configured to collect audio signals of the external environment of the earphone. For example, when the actual wearing state of the earphone is in-ear state, the audio collected by the feedforward microphone is mainly the friction sound generated between the earphone and the ear canal. When the actual wearing state of the earphone is out-ear state, the audio collected by the feedforward microphone is the external environment sound.

In an embodiment, differential feature analysis refers to the process of performing difference analysis on the features of the feedforward audio signal and the features of the feedback audio signal. The differential feature analysis includes but is not limited to distance differential feature analysis, time domain differential feature analysis, and frequency domain differential feature analysis. Distance differential feature analysis refers to the process of analyzing the differential features of the feedforward audio signal and the feedback audio signal in the time domain coordinates. Time domain differential feature analysis refers to the process of analyzing the differential features of the time domain of the feedforward audio signal and the time domain of the feedback audio signal. Frequency domain differential feature analysis refers to the process of analyzing the differential features of the frequency domain of the feedforward audio signal and the frequency domain of the feedback audio signal.

In an embodiment, a distance differential feature analysis is performed on the feedforward audio signal and the feedback audio signal to obtain a differential feature value between the feedforward audio signal and the feedback audio signal.

In an embodiment, the feature of the feedforward audio signal and the feature of the feedback audio signal are taken as two samples. The distance difference between each two corresponding features in the two samples is calculated, and the differential feature values of the feedforward audio signal and the feedback audio signal are determined according to all the calculated distance differential features.

In an embodiment, the implementation method of the distance analysis includes but is not limited to the Euclidean distance and the Bray-Curtis distance. In an embodiment, the Bray-Curtis distance can be adopted to perform distance differential feature analysis on the feedforward audio signal and the feedback audio signal.

In an embodiment, the preset maximum differential feature threshold value is configured to characterize the maximum differential feature value of the audio signal collected by the feedback microphone and the feedforward microphone in the in-ear state. That is, the differential feature value is not less than the preset maximum differential feature threshold value. It can be determined that the wearing state of the earphone is the in-ear state.

It can be understood that the preset maximum differential feature threshold value can be obtained by pre-measurement through experiments. The purpose of setting the above preset maximum differential feature threshold value is to identify whether the wearing state of the earphone is in-ear state by comparing the differential feature value with the preset maximum differential feature threshold value. When the earphone is switched to the in-ear state, the differential feature value and the preset maximum differential feature threshold value are configured to determine whether the earphone is indeed in the in-ear state, so as to improve the accuracy of the wearing state of the earphone detection.

In an embodiment, before the performing the differential feature analysis on the feedforward audio signal and the feedback audio signal, the method further includes:

in response to determining that the target power information is not less than a minimum power threshold value set for the target frequency and not greater than the maximum power threshold value set for the target frequency, performing the differential feature analysis on the feedforward audio signal and the feedback audio signal.

In an embodiment, the power threshold value set for the target frequency includes a maximum power threshold value and a minimum power threshold value. The maximum power threshold value is configured to characterize the power threshold value of the audio signal collected by the feedback microphone that is determined to be in-ear state at the target frequency. The minimum power threshold value is configured to characterize the power threshold value of the audio signal collected by the feedback microphone that is determined to be out-ear state at the target frequency. That is, if the target power information is not less than the maximum power threshold value, it can be determined that the wearing state of the earphone is in-ear state. If the target power information is less than the minimum power threshold value, it can be determined that the wearing state of the earphone is in-ear state. If the target power information is within the range of the minimum power threshold value and the maximum power threshold value, the wearing state of the earphone cannot be determined. That is, the target power information is not less than the minimum power threshold value set for the target frequency, and not greater than the maximum power threshold value set for the target frequency, the step of performing differential feature analysis on the feedforward audio signal and the feedback audio signal is executed.

It is understandable that the maximum power threshold value and the minimum power threshold value can be obtained by pre-measurement through experiments. The purpose of setting the above-mentioned maximum power threshold value is to identify whether the wearing state of the earphone is in-ear state by comparing the target power information with the maximum power threshold value. The purpose of setting the above-mentioned minimum power threshold value is to identify whether the wearing state of the earphone is out-ear state by comparing the target power information with the minimum power threshold value. When the earphone is switched to the in-ear state, the target power information and the maximum power threshold value are configured to determine whether the earphone is indeed in the in-ear state. Or, the target power information and the minimum power threshold value are configured to determine whether the earphone is in the out-ear state to improve the accuracy of the wearing state of the earphone detection.

In an embodiment, the method for detecting the wearing state of the earphone further includes:

in response to the differential feature value being less than the preset differential feature maximum threshold value, performing a correlation analysis on the feedforward audio signal and the feedback audio signal to determine a correlation coefficient;

in response to the differential feature value being greater than the preset differential feature minimum threshold value and the correlation coefficient being less than a preset correlation coefficient, determining that the wearing state of the earphone is in-ear state; or in response to the differential feature value being not greater than the preset differential feature minimum threshold value and the correlation coefficient being not less than a preset correlation coefficient, determining that the wearing state of the earphone is out-ear state.

The preset differential feature minimum threshold value is configured to characterize the minimum differential feature value of the audio signal collected by the feedback microphone and the feedforward microphone in the in-ear state, and the preset correlation coefficient is configured to characterize the maximum correlation of the audio signal collected by the feedback microphone and the feedforward microphone in the in-ear state.

In an embodiment, the preset correlation coefficient is configured to characterize the maximum correlation of the audio signals collected by the feedback microphone and the feedforward microphone in the in-ear state.

It is understandable that when the wearing state of the earphone is the out-ear state and the audio includes a prompt tone, the audio signal collected by the feedback microphone is mainly the external ambient sound and the prompt tone. According to the external ambient sound and the prompt tone, a feedback audio signal is generated. The audio signal collected by the feedforward microphone is mainly the external ambient sound. According to the external ambient sound, a feedforward audio signal is generated. Therefore, when the wearing state of the earphone is the out-ear state, the correlation between the audio signal collected by the feedback microphone and the audio signal collected by the feedforward microphone is large.

When the earphone is in the in-ear state, and the audio includes a prompt tone, the audio signal collected by the feedback microphone is the prompt tone. A feedback audio signal is generated according to the prompt tone. The audio signal collected by the feedforward microphone is the friction sound between the earphone and the ear canal when the earphone is in-ear state. A feedforward audio signal is generated according to the friction sound between the earphone and the ear canal when the earphone is in-ear state. Therefore, when the earphone is in the in-ear state, the correlation between the audio signal collected by the feedback microphone and the audio signal collected by the feedforward microphone is small.

It is understandable that the preset correlation coefficient can be obtained by pre-measurement through experiments. For example, when the wearing state of the earphone is in the in-ear state, the preset correlation coefficient of the audio signal collected by the feedback microphone and the audio signal collected by the feedforward microphone is set to 0.3. When the wearing state of the earphone is out-ear state, the preset correlation coefficient of the audio signal collected by the feedback microphone and the audio signal collected by the feedforward microphone is set to 0.8.

In an embodiment, the purpose of setting the above-mentioned preset correlation coefficient is to identify whether the wearing state of the earphone is in-ear state by comparing the correlation coefficient of the feedforward audio signal and the feedback audio signal with the preset correlation coefficient. When the earphone is switched to the in-ear state, it is determined whether the earphone is indeed in the in-ear state by comparing the correlation coefficient of the feedforward audio signal and the feedback audio signal with the preset correlation coefficient. When the differential feature value is greater than the preset differential feature minimum threshold value and the correlation coefficient is less than the preset correlation coefficient, it is determined that the wearing state of the earphone is in-ear state. In other cases, it is determined that the wearing state of the earphone is out-ear state. By combining the differential features and correlation coefficient of the feedforward audio signal and the feedback audio signal, the accuracy of the wearing state of the earphone detection is improved.

The embodiment further provides an apparatus for detecting a wearing state of an earphone, which can be integrated into an earphone.

Figure 2:
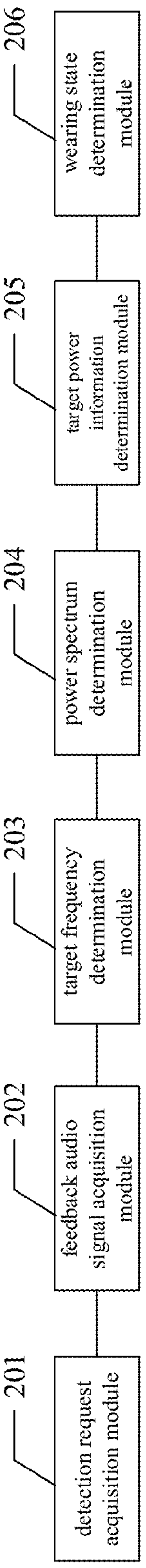
FIG. 2 is a schematic structural diagram of an apparatus for detecting a wearing state of an earphone according to an embodiment of the present application.

For example, as shown in FIG. 2, the apparatus for detecting the wearing state of the earphone may include a detection request acquisition module 201, a feedback audio signal acquisition module 202, a target frequency determination module 203, a power spectrum determination module 204, a target power information determination module 205, and a wearing state determination module 206.

The detection request acquisition module 201 is configured to obtain a request for detecting the wearing state of the earphone.

The feedback audio signal acquisition module 202 is configured to perform audio collection by a feedback microphone of the earphone to obtain a feedback audio signal.

The target frequency determination module 203 is configured to determine a target frequency with a power meeting a preset condition in the feedback audio signal based on the frequency and an audio collection parameter of the feedback microphone.

The power spectrum determination module 204 is configured to perform a power spectrum analysis on the feedback audio signal to obtain a power spectrum of the feedback audio signal.

The target power information determination module 205 is configured to determine target power information of the target frequency from the power spectrum.

The wearing state determination module 206 is configured to determine that the wearing state of the earphone is in-ear state in response to the target power information being not less than a maximum power threshold value set for the target frequency.

In the apparatus according to the embodiment of the present application, and in the feedback audio signal acquisition module 202, when audio is collected through the feedback microphone of the earphone, audio is also collected through the feedforward microphone of the earphone to obtain a feedforward audio signal.

The apparatus for detecting the wearing state of earphones further includes: a differential feature value determination unit, and a first wearing state determination unit.

The differential feature value determination unit is configured to perform a differential feature analysis on the feedforward audio signal and the feedback audio signal to obtain a differential feature value of the feedforward audio signal and the feedback audio signal.

The first wearing state determination unit is configured to in response to the differential feature value being not less than a preset differential feature maximum threshold value, determine that the wearing state of the earphone is in-ear state. The preset differential feature maximum threshold value is configured to characterize a maximum differential feature value of the audio signal collected by the feedback microphone and the feedforward microphone in the in-ear state.

In the apparatus according to the embodiment of the present application, and in the differential feature value determination unit, before the performing the differential feature analysis on the feedforward audio signal and the feedback audio signal, the apparatus further includes:

a differential feature analysis execution unit configured to in response to determining that the target power information is not less than a minimum power threshold value set for the target frequency and not greater than the maximum power threshold value set for the target frequency, perform the differential feature analysis on the feedforward audio signal and the feedback audio signal.

The apparatus according to the embodiment of the present application further includes: a correlation analysis unit and a second wearing state determination unit.

The correlation analysis unit is configured to in response to the differential feature value being less than the preset differential feature maximum threshold value, perform a correlation analysis on the feedforward audio signal and the feedback audio signal to determine a correlation coefficient.

The second wearing state determination unit is configured to in response to the differential feature value being greater than the preset differential feature minimum threshold value and the correlation coefficient being less than a preset correlation coefficient, determine that the wearing state of the earphone is in-ear state, or in response to the differential feature value being not greater than the preset differential feature minimum threshold value and the correlation coefficient being not less than the preset correlation coefficient, determine that the wearing state of the earphone is out-ear state.

The preset differential feature minimum threshold value is configured to characterize the minimum differential feature value of the audio signal collected by the feedback microphone and the feedforward microphone in the in-ear state, and the preset correlation coefficient is configured to characterize the maximum correlation of the audio signal collected by the feedback microphone and the feedforward microphone in the in-ear state.

In the apparatus according to the embodiment of the present application, in addition to the wearing state determination module 206, the apparatus further includes:

an out-ear state determination unit configured to determine that the wearing state of the earphone is the out-ear state in response to the target power information being less than a minimum power threshold value set for the target frequency.

In an embodiment, in the apparatus according to the embodiment of the present application, the audio collection parameter includes a sampling rate, and the target frequency determination module 203 includes: a frequency determination unit, a first target frequency determination unit, and a second target frequency determination unit.

The frequency determination unit is configured to calculate the frequency with the highest power in the audio signal collected by the feedback microphone based on the sampling rate.

The first target frequency determination unit is configured to adjust the sampling rate in response to the difference between the frequency with the maximum power and the frequency being greater than the frequency difference, until the difference is not greater than the frequency difference, and to configure the frequency with the maximum power as the target frequency.

The second target frequency determination unit is configured to configure the maximum power as the target frequency in response to the difference between the frequency with the maximum power and the frequency being not greater than the frequency difference.

In an embodiment, in the apparatus according to the embodiment of the present application, and in the detection request acquisition module 201, the obtaining the request for detecting the wearing state of the earphone includes:

- a first generation unit configured to periodically generate a request for detecting the wearing state of the earphone; or,
- a second generation unit configured to generate a request for detecting the wearing state of the earphone in response to the sensor of the earphone recognizing that the wearing state of the earphone is switched to the in-ear state.

The apparatus of the embodiment can be configured to perform power spectrum analysis on the feedback audio signal collected by the feedback microphone, determine the target frequency in the feedback audio signal whose power meets the preset conditions, and analyze the target power information of the target frequency, thereby improving the detection accuracy of the wearing state of the earphone.

Accordingly, the embodiment of the present application further provides an earphone. The type of the earphone is not limited, such as wired earphone, wireless earphone, Bluetooth earphone, head-mounted earphone, etc.

Figure 3:
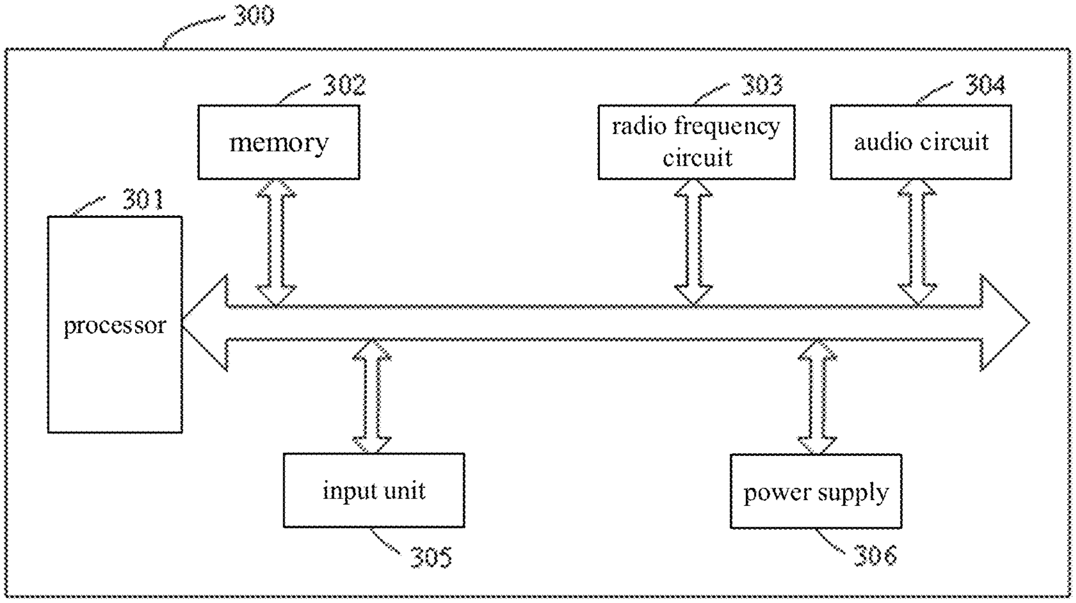
FIG. 3 is a schematic structural diagram of an earphone according to an embodiment of the present application.

As shown in FIG. 3, which is a schematic structural diagram of the earphone according to an embodiment of the present application, the earphone 300 includes a processor 301 with one or more processing cores, a memory 302 with one or more computer-readable storage medium, and a computer program stored in the memory 302 and executable on the processor. The processor 301 is electrically connected to the memory 302. Those skilled in the art will understand that the earphone structure shown in the figure does not constitute a limitation on the earphone. It may include more or fewer components than shown in the figure, or combine certain components, or arrange the components differently.

The processor 301 is the control center of the earphone 300. It uses various interfaces and lines to connect various parts of the entire earphone 300, runs or loads software programs and/or units stored in the memory 302, calls data stored in the memory 302, and also executes various functions of the earphone 300 and processes data. The processor 301 can be a central processing unit (CPU), a network processor (NP), etc., which can implement or execute various methods, steps and logic block diagrams disclosed in the embodiments of the present application.

In the embodiment of the present application, the processor 301 in the earphone 300 will follow the following steps to load instructions corresponding to the processes of one or more applications into the memory 302. The processor 301 will run the application stored in the memory 302 to achieve various functions. For example:

- obtaining a request for detecting the wearing state of the earphone;
- performing audio collection by a feedback microphone of the earphone to obtain a feedback audio signal;
- determining a frequency of the audio, and determining a target frequency with a power meeting a preset condition in the feedback audio signal based on the frequency and an audio collection parameter of the feedback microphone;
- performing a power spectrum analysis on the feedback audio signal to obtain a power spectrum of the feedback audio signal;
- determining target power information of the target frequency from the power spectrum; and
- in response to the target power information being not less than a maximum power threshold value set for the target frequency, determining that the wearing state of the earphone is in-ear state.

In an embodiment, the application program stored in the memory 302 is run to realize various functions, which can be referred to the description in the above embodiment and will not be repeated here.

The specific implementation of each of the above operations can be found in the previous embodiments and will not be described in detail here.

In an embodiment, as shown in FIG. 3, the earphone 300 further includes: a radio frequency circuit 303, an audio circuit 304, an input unit 305, and a power supply 306. The processor 301 is electrically connected to the radio frequency circuit 303, the audio circuit 304, the input unit 305, and the power supply 306, respectively. Those skilled in the art will appreciate that the earphone structure shown in FIG. 3 does not constitute a limitation on the earphone. It may include more or fewer components than shown in the figure, or combine certain components, or arrange the components differently.

The radio frequency circuit 303 can be configured to send and receive radio frequency signals to establish wireless communication with network devices or other earphones such as terminals through wireless communication, and to send and receive signals (such as audio signals to achieve audio playback) between network devices or other earphones.

The audio circuit 304 can be configured to play and collect audio signals through a speaker and a microphone. The audio circuit 304 can convert the received audio data into an electrical signal, and transmit the electrical signal to the speaker. The speaker converts the electrical signal into a sound signal for output. In an embodiment, the microphone converts the collected sound signal into an electrical signal. After being received by the audio circuit 304, the electrical signal is converted into audio data. After the audio data is then output to the processor 301 for processing, the electrical signal is sent to another earphone through the radio frequency circuit 303, or the audio data is output to the memory 302 for further processing.

The input unit 305 may be configured to receive input control information (such as volume adjustment information, song switching information, playback speed fast forward and fast rewind information, etc.). In an embodiment, the input unit may include a mechanical button.

The power supply 306 is configured to supply power to various components of the earphone 300. In an embodiment, the power supply 306 can be logically connected to the processor 301 through a power management system. Thus, the power management system can be configured to manage charging, discharging, and power consumption. The power supply 306 can also include one or more DC or AC power supplies, recharging systems, power failure detection circuits, power converters or inverters, power state indicators, etc.

Although not shown in FIG. 3, the earphone 300 may further include a sensor (such as an optical sensor and a capacitive sensor, etc.), a Wi-Fi module, a Bluetooth module, etc., which will not be described in detail here.

In the above embodiments, the description of each embodiment has its own emphasis. For parts that are not described in detail in a certain embodiment, can be referred to the relevant description of other embodiments.

Those skilled in the art will appreciate that all or part of the steps in the various methods of the above embodiments may be completed by instructions, or by controlling related hardware through instructions. The instructions may be stored in a computer-readable storage medium, and loaded and executed by a processor.

To this end, the present application embodiment provides a computer-readable storage medium. Multiple computer programs are stored therein. The computer programs can be loaded by a processor to execute any one of the method for detecting the wearing state of the earphones according to the embodiment of the present application. For example, the computer program can execute the following steps of the method for detecting the wearing state of the earphone:

obtaining a request for detecting the wearing state of the earphone;

performing audio collection by a feedback microphone of the earphone to obtain a feedback audio signal;

determining a frequency of the audio, and determining a target frequency with a power meeting a preset condition in the feedback audio signal based on the frequency and an audio collection parameter of the feedback microphone;

performing a power spectrum analysis on the feedback audio signal to obtain a power spectrum of the feedback audio signal;

determining target power information of the target frequency from the power spectrum; and in response to the target power information being not less than a maximum power threshold value set for the target frequency, determining that the wearing state of the earphone is in-ear state.

In an embodiment, the detailed steps of the above method steps can also refer to the description in the above embodiments, which will not be repeated here.

The specific implementation of each of the above operations can be found in the previous embodiments and will not be described in detail here.

The computer-readable storage medium may include: a read-only memory (ROM), a random access memory (RAM), a disk or an optical disk, etc.

Since the computer program stored in the computer-readable storage medium can execute any of the method for detecting the wearing state of the earphones provided in the embodiments of the present application, the beneficial effects that can be achieved by any of the method for detecting the wearing state of the earphones provided in the embodiments of the present application can be achieved. Reference can be made to the previous embodiments for details, which will not be repeated here.

According to one aspect of the present application, a computer program product or a computer program is also provided. The computer program product or the computer program includes computer instructions. The computer instructions are stored in a computer-readable storage medium. A processor of the earphone reads the computer instructions from the computer-readable storage medium. The processor executes the computer instructions, so that the earphone executes the methods provided in various implementations in the above embodiments.

In the above-mentioned apparatus for detecting a wearing state of an earphone, computer-readable storage medium, earphone, and computer program product embodiments, the description of each embodiment has its own emphasis. For parts that are not described in detail in a certain embodiment, can be referred to the relevant descriptions of other embodiments. Those skilled in the art can clearly understand that for the convenience and simplicity of description, the specific working process and beneficial effects of the above-described apparatus for detecting a wearing state of an earphone, computer-readable storage medium, computer program product, earphone and its corresponding units can refer to the description of the method for detecting the wearing state of the earphone in the above embodiment, which will not be repeated here.

The above is a detailed introduction to a method and an apparatus for detecting a wearing state of an earphone, an earphone, a computer-readable storage medium and computer program product provided in the embodiments of the present application. Specific examples are used in this article to illustrate the principles and implementation methods of the present application. The description of the above embodiments is only used to help understand the method and core ideas of the present application; at the same time, for those skilled in the art, according to the ideas of the present application, there will be changes in the specific implementation methods and application scope. In summary, the content of this specification should not be understood as a limitation on the present application.

What is claimed is:

1. A method for detecting a wearing state of an earphone, comprising:

obtaining a request for detecting the wearing state of the earphone;

performing audio collection by a feedback microphone of the earphone to obtain a feedback audio signal;

determining a frequency of the audio, and determining a target frequency with a power meeting a preset condition in the feedback audio signal based on the frequency and an audio collection parameter of the feedback microphone;

performing a power spectrum analysis on the feedback audio signal to obtain a power spectrum of the feedback audio signal;

determining target power information of the target frequency from the power spectrum; and in response to the target power information being not less than a maximum power threshold value set for the target frequency, determining that the wearing state of the earphone is in-ear state.

2. The method according to claim 1, wherein in response to performing the audio collection by the feedback microphone of the earphone, the method further comprises:

performing the audio collection by a feedforward microphone of the earphone to obtain a feedforward audio signal;

performing a differential feature analysis on the feedforward audio signal and the feedback audio signal to obtain a differential feature value of the feedforward audio signal and the feedback audio signal; and in response to the differential feature value being not less than a preset differential feature maximum threshold value, determining that the wearing state of the earphone is in-ear state, wherein the preset differential feature maximum threshold value is configured to characterize a maximum differential feature value of the audio signal collected by the feedback microphone and the feedforward microphone in the in-ear state.

3. The method according to claim 2, wherein before the performing the differential feature analysis on the feedforward audio signal and the feedback audio signal, the method further comprises:

in response to determining that the target power information is not less than a minimum power threshold value set for the target frequency and not greater than the maximum power threshold value set for the target frequency, performing the differential feature analysis on the feedforward audio signal and the feedback audio signal.

4. The method according to claim 2, further comprising:

in response to the differential feature value being less than the preset differential feature maximum threshold value, performing a correlation analysis on the feedforward audio signal and the feedback audio signal to determine a correlation coefficient;

in response to the differential feature value being greater than the preset differential feature minimum threshold value and the correlation coefficient being less than a preset correlation coefficient, determining that the wearing state of the earphone is in-ear state; or in response to the differential feature value being not greater than the preset differential feature minimum threshold value and the correlation coefficient being not less than a preset correlation coefficient, determining that the wearing state of the earphone is out-ear state, wherein the preset differential feature minimum threshold value is configured to characterize the minimum differential feature value of the audio signal collected by the feedback microphone and the feedforward microphone in the in-ear state, and the preset correlation coefficient is configured to characterize the maximum correlation of the audio signal collected by the feedback microphone and the feedforward microphone in the in-ear state.

5. The method according to claim 1, wherein after the in response to the target power information being not less than the maximum power threshold value set for the target frequency, determining that the wearing state of the earphone is in-ear state, the method further comprises:

in response to the target power information being less than a minimum power threshold value set for the target frequency, determining that the wearing state of the earphone is an out-ear state.

6. The method according to claim 1, wherein the audio collection parameter comprises a sampling rate; the determining the target frequency with the power meeting the preset condition in the feedback audio signal based on the frequency and the audio collection parameter of the feedback microphone comprises:

calculating a power spectrum of the feedback audio signal based on the sampling rate and frequency; and configuring a frequency with the maximum power as the target frequency according to the power spectrum.

7. The method according to claim 1, wherein the audio collection parameter comprises the sampling rate; the determining the target frequency with the power meeting the preset condition in the feedback audio signal based on the frequency and the audio collection parameter of the feedback microphone comprises:

calculating the frequency with the maximum power in the audio signal collected by the feedback microphone based on the sampling rate;

in response to a difference between the frequency with the maximum power and the frequency being greater than a frequency difference, adjusting the sampling rate until the difference is not greater than the frequency difference, configuring the frequency with the maximum power as the target frequency; or in response to the difference between the frequency with the maximum power and the frequency being not greater than the frequency difference, configuring the frequency with the maximum power as the target frequency.

8. The method according to claim 1, wherein the obtaining the request for detecting the wearing state of the earphone comprises:

generating the request for detecting the wearing state of the earphone periodically; or in response to a sensor of the earphone recognizing that the wearing state of the earphone is switched to the in-ear state, generating the request for detecting the wearing state of the earphone.

9. An earphone, comprising:

a processor, and a memory, wherein the memory stores instructions loaded by the processor to execute the method for detecting the wearing state of the earphone according to claim 1.

10. A non-transitory computer-readable storage medium, wherein the non-transitory computer-readable storage medium stores instructions suitable for a processor to load to execute the method for detecting the wearing state of the earphone according to claim 1.

11. An apparatus for detecting a wearing state of an earphone, comprising:

a detection request acquisition module configured to obtain a request for detecting the wearing state of the earphone;

a feedback audio signal acquisition module configured to perform audio collection by a feedback microphone of the earphone to obtain a feedback audio signal;

a target frequency determination module configured to determine a target frequency with a power meeting a preset condition in the feedback audio signal based on the frequency and an audio collection parameter of the feedback microphone;

a power spectrum determination module configured to perform a power spectrum analysis on the feedback audio signal to obtain a power spectrum of the feedback audio signal;

a target power information determination module configured to determine target power information of the target frequency from the power spectrum; and a wearing state determination module configured to determine that the wearing state of the earphone is in-ear state in response to the target power information being not less than a maximum power threshold value set for the target frequency.

12. The apparatus according to claim 11, wherein the feedback audio signal acquisition module is further configured to perform the audio collection by a feedforward microphone of the earphone to obtain a feedforward audio signal.

13. The apparatus according to claim 12, further comprising:

a differential feature value determination unit configured to perform a differential feature analysis on the feedforward audio signal and the feedback audio signal to obtain a differential feature value of the feedforward audio signal and the feedback audio signal; and a first wearing state determination unit configured to in response to the differential feature value being not less than a preset differential feature maximum threshold value, determine that the wearing state of the earphone is in-ear state, wherein the preset differential feature maximum threshold value is configured to characterize a maximum differential feature value of the audio signal collected by the feedback microphone and the feedforward microphone in the in-ear state.

14. The apparatus according to claim 13, further comprising:

a differential feature analysis execution unit configured to in response to determining that the target power information is not less than a minimum power threshold value set for the target frequency and not greater than the maximum power threshold value set for the target frequency, perform the differential feature analysis on the feedforward audio signal and the feedback audio signal.

15. The apparatus according to claim 13, further comprising:

a correlation analysis unit configured to in response to the differential feature value being less than the preset differential feature maximum threshold value, perform a correlation analysis on the feedforward audio signal and the feedback audio signal to determine a correlation coefficient; and a second wearing state determination unit configured to in response to the differential feature value being greater than the preset differential feature minimum threshold value and the correlation coefficient being less than a preset correlation coefficient, determine that the wearing state of the earphone is in-ear state, or in response to the differential feature value being not greater than the preset differential feature minimum threshold value and the correlation coefficient being not less than the preset correlation coefficient, determine that the wearing state of the earphone is out-ear state.

* * * * *